United States Patent [19]
Kunze

[11] 4,201,445
[45] May 6, 1980

[54] PLUG CONNECTION FOR LIGHT-WAVE CONDUCTORS

[75] Inventor: Dieter Kunze, Neuried, Fed. Rep. of Germany

[73] Assignee: Siemens Aktiengesellschaft, Berlin & Munich, Fed. Rep. of Germany

[21] Appl. No.: 901,000

[22] Filed: Apr. 28, 1978

[30] Foreign Application Priority Data

May 24, 1977 [DE] Fed. Rep. of Germany ....... 2723440

[51] Int. Cl.$^2$ ................................................ G02B 5/14
[52] U.S. Cl. ................................................ 350/96.21
[58] Field of Search ............... 350/96.15, 96.20, 96.21, 350/96.22

[56] References Cited

U.S. PATENT DOCUMENTS

| | | | |
|---|---|---|---|
| 3,734,594 | 5/1973 | Trambarulo | 350/96.21 |
| 3,870,395 | 3/1975 | Schicketanz | 350/96.21 |
| 3,880,452 | 4/1975 | Fields | 350/96.21 X |
| 3,982,815 | 9/1976 | Nakayama | 350/96.21 |
| 4,087,158 | 5/1978 | Lewis et al. | 350/96.21 |

FOREIGN PATENT DOCUMENTS

| | | |
|---|---|---|
| 969744 | 6/1975 | Canada . |
| 2345273 | 3/1974 | Fed. Rep. of Germany . |
| 2701436 | 7/1977 | Fed. Rep. of Germany ........ 350/96.21 |

*Primary Examiner*—John K. Corbin
*Assistant Examiner*—John D. Lee
*Attorney, Agent, or Firm*—Hill, Van Santen, Steadman, Chiara & Simpson

[57] ABSTRACT

A releasable connection device for light-wave conductors disposed in concentric plug components characterized by sleeve means for centering and aligning the components with the sleeve means being either a single member having a bore for receiving the components and slots extending from each end so that the member can be constricted by locking nuts onto the components or being formed of a plurality of elements held together by ring elements with longitudinal slots so that locking nuts can collapse or constrict the elements into tight engagement to align the components disposed therein.

12 Claims, 4 Drawing Figures

PLUG CONNECTION FOR LIGHT-WAVE CONDUCTORS

BACKGROUND OF THE INVENTION

1. Field of the Invention

The present invention is directed to a releasable connection device for light waveguides or light-wave conductors concentrically arranged in plug components.

2. Prior Art

A great many arrangements or devices as well as methods have been suggested for forming connections of light-wave conductors. In U.S. Pat. No. 3,870,395 (which is based on German Offenlegungsschrift No. 2,233,916), an arrangement is described for connecting separate light-wave conductors by inserting the light-wave conductors into the opposite ends of a cylindrical capillary tube. After the separate light-wave conductors are pushed until the ends are in contact, the conductors are clamped in the tube by means positioned at the ends of the tube.

Another embodiment is disclosed in Canadian Pat. No. 969,744, which corresponds to German patent Offenlegungsschrift No. 2,345,273. In this device, a V-shaped groove is used to center the light-wave conductors.

Due to the very small diameter or dimensions of the light-wave conductors, a high degree of accuracy is required in manufacturing each of these types of guide elements or devices. In addition, these elements also require a great deal of time for inserting the conductors or fibers in the guide elements as well as suitable auxiliary equipment which is required during the assembly steps.

SUMMARY OF THE INVENTION

The present invention is directed to a releasable connection device for connecting light-wave conductors or fibers disposed in concentric plug components which device reduces tolerances in the area of the junction point so that losses at the junction point of the light-wave conductors, which are largely dependent on the dimensional tolerances of the connection arrangement or device, are reduced or eliminated and which device during a coupling operation simultaneously provides alignment, centering and locking of the light-wave conductors or light waveguides therein.

To accomplish these goals, a releasable connection device for light-wave conductors disposed in concentric plug components, the device comprising sleeve means for telescopically receiving the components, said sleeve means having external threads and being provided with means for forming at least one lengthwise extending slot, said sleeve means having means for forming a bore for receiving the plug components containing the light-wave conductors and enabling axial movement of the components within the means for forming the bore, and locking nuts acting on the external threads of the sleeve means, said threads of the sleeve means and the locking nuts being configured so that the threading of the locking nuts on the external threads axially shifts the plug components into abutting relationship and then radially constricts the sleeve means to decrease the means for forming the bore to frictionally hold the plug components in an axially aligned position and pressed together to form a connection therebetween.

A fundamental feature of the invention is that the light-wave conductors to be connected are concentrically held in the plug components and that the plug components are automatically centered, aligned, and fixed in the desired position in a common guide sleeve means at the same time as the two plug components have been brought into contact during the coupling operation. Thus, no additional positioning operation or steps are required.

In order to be able to do this, the plug components are provided with locking nuts which engage an external thread on the sleeve means so that when these locking nuts are threaded on the threads of the sleeve means an axial movement of the plug component is brought about in the sleeve means. The sleeve means may be a single piece having means forming a bore or may be formed by joining several suitable separate parts. The plug components can be easily introduced into the bore from both ends and be moved until they come into abutting contact. In order to fulfill the purpose of this invention, the threads are provided with surfaces such that a continuing of a threading movement after both plug components have come into contact causes a radial force to be produced on the surfaces of the threads of the sleeve means, which forces, presses or constricts the sleeve means to close the lengthwise or longitudinally extending slots as the locking nuts apply an axial pressure on the components. Since this operation takes place gradually and evenly, the plug components located in the bore are centered, axially aligned and finally held in a fixed postion. Special attention is to be paid to the fact that the axial and radial forces are matched to each other by a correct choice of the angle of the threads so that with axial, free movement, there will be no jamming and that the radial force acting after contact will be sufficient to press the wall of the sleeves together which walls centers and fixes the plug components.

Preferably, the angle of the threads is about 90° which produces the desired axial and radial forces. To promote the radial movement, the external thread of the sleeve means is hardly formed or not formed at all in the area of the lengthwise running slots. The sleeve means itself may be designed as a closed sleeve with longitudinal slots but may also be formed by joining of several suitable shaped longitudinally extending components. If two longitudinal componets are used and have a prism cross-sectional shape, a double V-shaped centering bore can be produced. These longitudinal components are, however, dimensioned so that after joining there are longitudinal joints therebetween which are also considered as longitudinal slots. The necessary retention of the longitudinal components is guaranteed by suitable retaining elements such as snap rings or clamps.

For the sleeve means, which is a closed or single element, it is a good idea to stagger the slots, which begin at one end and run longitudinally by 90° relative to the slots which extend inward from the opposite end so that in the center area the slots can be intersected but with a staggered relationship. This makes the guide sleeve extremely flexible. With guide sleeve consisting of several longitudinal components or elements, it is particularly advantageous to make the outside threads a multiple thread so that completely identical longitudinal components or elements can be used. Matching of this nature also ensures that the threads of the locking nuts, when put on the sleeve means, is inserted in all the threads of the staggered longitudinal components at the same time and is therefore acting effectively thereon.

A particularly fine embodiment of the sleeve means is formed by several parts, for example, three identical longitudinal components so that the lengthwise or longitudinally extending slots would be staggered 120°.

DETAILED DESCRIPTION OF THE PREFERRED EMBODIMENTS

Figure 1:
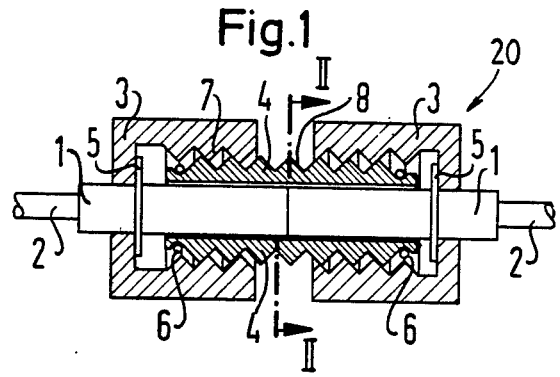
FIG. 1 is a cross-sectional view through a complete connection device according to the present invention.

The principles of the present invention are particularly useful when incorporated in a releasable connection device generally indicated at 20 in FIG. 1. As illustrated, the connecting device 20 has sleeve means formed by two longitudinally extending elements or components 4 which sleeve means receives two plug components 1 each having a light-wave conductor or fiber 2 arranged concentrically therein. Each of the plug components 1 has an abutment 5, which will support and be engaged by a locking nut 3. Both plug components 1 are introduced axially into a bore of the sleeve means with the ends being urged into or toward a common junction point. The diameter of the bore of the sleeve means is dimensioned so that the plug components 1 can be easily moved axially therein. Each of the elements 4 of the sleeve means is provided with external threads 8, which are engaged by the internal threads 7 of the locking nuts 3.

Figure 2:
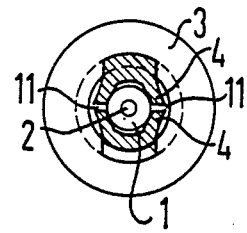
FIG. 2 is a cross-sectional view taken along lines II—II of FIG. 1.

The sleeve means of FIGS. 1 and 2 is formed of two longitudinally extending components 4 which, as best illustrated in FIG. 2, have a prism-shaped cross section so that a bore is formed for receiving and guiding the plug components 1. These longitudinal components 4 are held together by retaining elements in the form of snap rings or clamps 6 so that the two longitudinal components 4 are separated by lengthwise or longitudinally extending slots 11. The angle of the threads 8, as well as the threads 7, should preferably be 90°. With the threading of the nuts 3 onto the threads 8 each of the plug components 1 are moved axially in the bore until they come into abutting relation with each other. Then the reaction force acts on the thread surfaces which are located approximately 45° to the center line to produce a radial force, which constricts the components 4 forming the sleeve means to align and center each of the plug components 1. In FIG. 2, the cross section of the sleeve means, which is composed of two components 4, is illustrated and the sleeve means receives the plug component 1 which concentrically positions the light-wave conductor 2. The longitudinal components 4 of the sleeve means have no threads on the side or in the areas of the slots 11 as a result of which the centering or radial constrictive forces will be approximately the same magnitude as the axial force forcing the plugs into abutting relationship.

Figure 3:
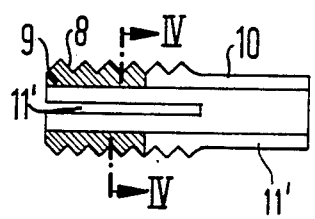
FIG. 3 is a cross-sectional view of an element of the connection device taken along lines III—III of FIG. 4.
Figure 4:
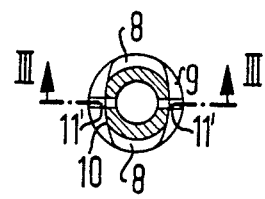
FIG. 4 is a cross-sectional view taken along lines IV—IV of FIG. 3.

An embodiment of the sleeve means is illustrated in FIGS. 3 and 4. This sleeve means is formed by a single member or sleeve member 9 which has a substantially cylindrical cross section. The sleeve means has a cylindrical bore with a diameter, which is the same or slightly smaller than the diameter of the plug components 1 which are to be introduced therein. However, it should be noted that the material of the sleeve 9 is capable of expanding due to its spring action or elastic nature. Furthermore, the sleeve 9 has slots 11', which extend inward from each end which slots 11' in addition are also staggered in relation to each other by 90° so that the overlapping of the slots 11' in the central area of the sleeve 9 is possible. As a result of this, the sleeve member 9, which is preferably made of metal, is given a particular degree of elasticity and can be pressed together by the radial force acting on the outside or external threads 8 to center the plug components 1 which are introduced in the bore and to finally hold them in a fixed, aligned position. For the reasons mentioned hereinabove, there are no threads in the areas of the slots 11' or the threads 8 are suitably terminated or removed from the areas 10 which are immediately adjacent each of the slots 11'. The method of operation of this embodiment of the connecting arrangement or device is in no way altered so that the coupling operation will take place in the same manner as described with regard to the embodiment illustrated in FIGS. 1 and 2.

The locking nuts 3 of the plug components 1 may also be formed in such a way that they have the threads arranged only on part of their interior periphery so that the locking nuts 3 with interrupted threads can be pushed axially onto the sleeve means with the interrupted threads of each being axially aligned to be out of engagement with each other. The threads are only engaged at the time of the threading between the nuts and sleeve means. For handling purposes, it is also advantageous if the threads are locked or blocked on one side so that the locking nuts 3 come up against a stop after having been turned through a specific angle. Likewise, the threads of the locking nut may also be tapered on several of the teeth.

Since the plug components 1 are coupled together with a radial force acting on the plug components 1 in a direct consequence to the reacting force, the plug components 1 come against a stop or against each other and are then axially aligned by constricting of the sleeve means. Thus, the present invention fulfills all the requirements of simultaneously forming an abutting junction and aligning the components.

Although various minor modifications may be suggested by those versed in the art, it should be understood that I wish to embody within the scope of the patent warranted hereon, all such modifications as reasonably and properly come within the scope of my contribution to the art.

I claim:

1. A releasable connecting device for light-wave conductors disposed in concentric plug components, the device comprising sleeve means for telescopically receiving the components, said sleeve means having external threads and being provided with means for forming at least one lengthwise extending slot, said sleeve means having means for forming a bore for receiving the plug components containing the light-wave conductors and enabling axial movement of the components within the means for forming the bore, and locking nuts acting on the external threads of the sleeve means, each of said locking nuts having a surface for engaging the component and applying an axial force thereto, said threads of the sleeve means and the locking nuts being configured so that threading of the locking nuts on the external threads axially shifts the plug components into abutting relationship and then radially constricts the sleeve means to decrease the means for forming the bore to frictionally hold the plug components in an axially aligned position and pressed together to form a connection therebetween.

2. A releasable connecting device according to claim 1, wherein the sleeve means is free of external threads in the area of the means forming said slots.

3. A releasable connecting device in accordance with claim 2, wherein the sleeve means comprises a one piece member having several slots extending axially inward from each end.

4. A releasable connecting device according to claim 1, wherein the sleeve means is formed by a pair of members having a prism-shaped cross section, said pair of members being held together by annular retaining elements assembled thereon.

5. A releasable connecting device according to claim 4, wherein each of said members of the sleeve means has a groove running along the periphery adjacent each end, and said annular retaining elements being disposed in said groove for holding the members together.

6. A releasable connecting device according to claim 1, wherein the sleeve means is formed by three longitudinal extending members, said members being held together by retaining elements.

7. A releasable connecting device according to claim 1, wherein the sleeve means comprises a one piece member being provided with several slots running axially inward from each end thereof.

8. A releasable connecting device according to claim 7, wherein the sleeve means has a cylindrical bore having a diameter somewhat smaller than the outside diameter of the plug components.

9. A releasable connecting device according to claim 1, wherein the sleeve means comprises a one piece member and is provided with slots extending inward from each end, each of said slots from one end being staggered from the slots from the other end by 90°.

10. A releasable connecting device according to claim 1, wherein the means forming longitudinal slots forms three slots staggered by 120° relative to each other.

11. A releasable connecting device according to claim 1, wherein each of the threads has an angle of the thread of approximately 90°.

12. A releasable connecting device according to claim 1, wherein the external threads are in the form of multiple threads.

* * * * *